US009236920B2

(12) United States Patent
Marsch et al.

(10) Patent No.: US 9,236,920 B2
(45) Date of Patent: Jan. 12, 2016

(54) USAGE OF MULTIFLOW AND MULTIPLE INPUT MULTIPLE OUTPUT IN CELLULAR COMMUNICATION SYSTEMS

(75) Inventors: Patrick Marsch, Wroclaw (PL); Hans Thomas Hoehne, Helsinki (FI); Krystian Pawlak, Ostrow Wielkopolski (PL)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/375,514

(22) PCT Filed: Jan. 30, 2012

(86) PCT No.: PCT/EP2012/051472
§ 371 (c)(1),
(2), (4) Date: Oct. 9, 2014

(87) PCT Pub. No.: WO2013/113364
PCT Pub. Date: Aug. 8, 2013

(65) Prior Publication Data
US 2015/0063480 A1    Mar. 5, 2015

(51) Int. Cl.
*H04B 7/02* (2006.01)
*H04B 7/04* (2006.01)
*H04L 5/00* (2006.01)
*H04W 88/08* (2009.01)

(52) U.S. Cl.
CPC .............. *H04B 7/0413* (2013.01); *H04B 7/024* (2013.01); *H04L 5/003* (2013.01); *H04L 5/0023* (2013.01); *H04L 5/0035* (2013.01); *H04W 88/08* (2013.01); *H04B 7/0486* (2013.01)

(58) Field of Classification Search
USPC ......................................................... 375/267
See application file for complete search history.

(56) References Cited

U.S. PATENT DOCUMENTS

2010/0027456 A1* 2/2010 Onggosanusi et al. ........ 370/312
2010/0091678 A1 4/2010 Chen et al. .................... 370/252

OTHER PUBLICATIONS

Analysis of the capacity and latency constraints in CoMP, 3GPP TSG RAN WG1 Meeting #63BIS, Jan. 17-21, 2001.*
3GPP TSG RAN WG1 Meeting #63BIS, "Analysis of the capacity and latency constraints in CoMP"; Dublin, Ireland Jan. 17-21, 2011; R1-110107; 6 pgs.

* cited by examiner

*Primary Examiner* — Tanmay Shah
(74) *Attorney, Agent, or Firm* — Harrington & Smith

(57) ABSTRACT

For each base station of K base stations of a cellular communications network a maximum number of wanted data streams per carrier is decided that is to be scheduled to a terminal accessing the cellular communications network. The terminal has $N_R$ receive antennas and K is an integer equal to or greater than two. Information regarding the decision is signaled to at least one of the K base stations.

26 Claims, 5 Drawing Sheets

_US 9,236,920 B2_

USAGE OF MULTIFLOW AND MULTIPLE INPUT MULTIPLE OUTPUT IN CELLULAR COMMUNICATION SYSTEMS

BACKGROUND OF THE INVENTION

1. Field of the Invention

The present invention relates to usage of MF and MIMO in cellular communication systems, e.g. HSPA networks.

2. Related Background Art

The following meanings for the abbreviations used in this specification apply:
CQI channel quality indicator
HO handover
HSDPA high speed downlink packet access
HSDPA high speed downlink packet access
HSPA high speed packet access
LTE long term evolution
MF Multiflow
MIMO multiple input multiple output
PCI precoding control indicator
RACH random access channel
RAT radio access technology
RNC radio network controller
RRC radio resource control
SF-DC MF single frequency dual cell multi flow
SINR signal to interference and noise ratio
TTI time transfer interval
TX transmit
UE user equipment
UL uplink Both MIMO, i.e. beamforming or adaptive single-/multi-stream MIMO, and MF, i.e. simultaneous transmission from two cells to one terminal, are promising features in HSDPA. However, they may in some cases not be used simultaneously. More precisely, if a terminal has $N_R$ receive antennas, it may only receive up to $N_R$ data streams instantaneously, originating from one or multiple cells. For example, if a terminal has 2 receive antennas, it may receive dual-stream MIMO from one cell, or a single stream from two cells, but not MIMO and MF simultaneously from both cells.

According to the example shown in FIG. 1, a UE has $N_R=4$ receive antennas, so it may receive up to 4 data streams per carrier. A base station BS1 of a cellular communications network has $N_A=4$ transmit antennas and may transmit up to 4 data streams per carrier to each terminal. Similarly, a base station BS2 of the cellular communications network has $N_A=4$ transmit antennas and may transmit up to 4 data streams per carrier. The BS1 and the BS2 are controlled by an RNC of the cellular communications network.

Hence, a problem arises that when using MIMO and MF it has to be ensured that the overall number of transmitted data streams on one carrier meets UE capabilities.

Currently, fixed signal margins are used to determine whether a terminal (UE) is in an HO area and hence applicable to MF or not.

SUMMARY OF THE INVENTION

The present invention aims at solving the above problem. In particular, the invention aims at providing a combined usage of MIMO and MF techniques, e.g. in HSDPA.

This is achieved by the methods and apparatuses defined in the appended claims. The invention may also be implemented by a computer program product.

According to one or more embodiments of the invention, an efficient and dynamic usage of MF and MIMO in a cellular communications network is enabled, preferably in a network using HSDPA techniques.

In the following the invention will be described by way of embodiments thereof with reference to the accompanying drawings.

BRIEF DESCRIPTION OF THE DRAWINGS

FIG. 5 shows a flowchart illustrating a process of using MIMO and MF according to an embodiment of the invention.

DESCRIPTION OF THE EMBODIMENTS

In the following embodiments of the invention are described of how to jointly use MF and MIMO in a cellular communications network without running into the problem stated above. According to the invention, it is assured that, at any time, a terminal (UE) with $N_R$ receive antennas will not receive more than a total of $N_R$ data streams on the same carrier from the involved base stations.

Figure 1:
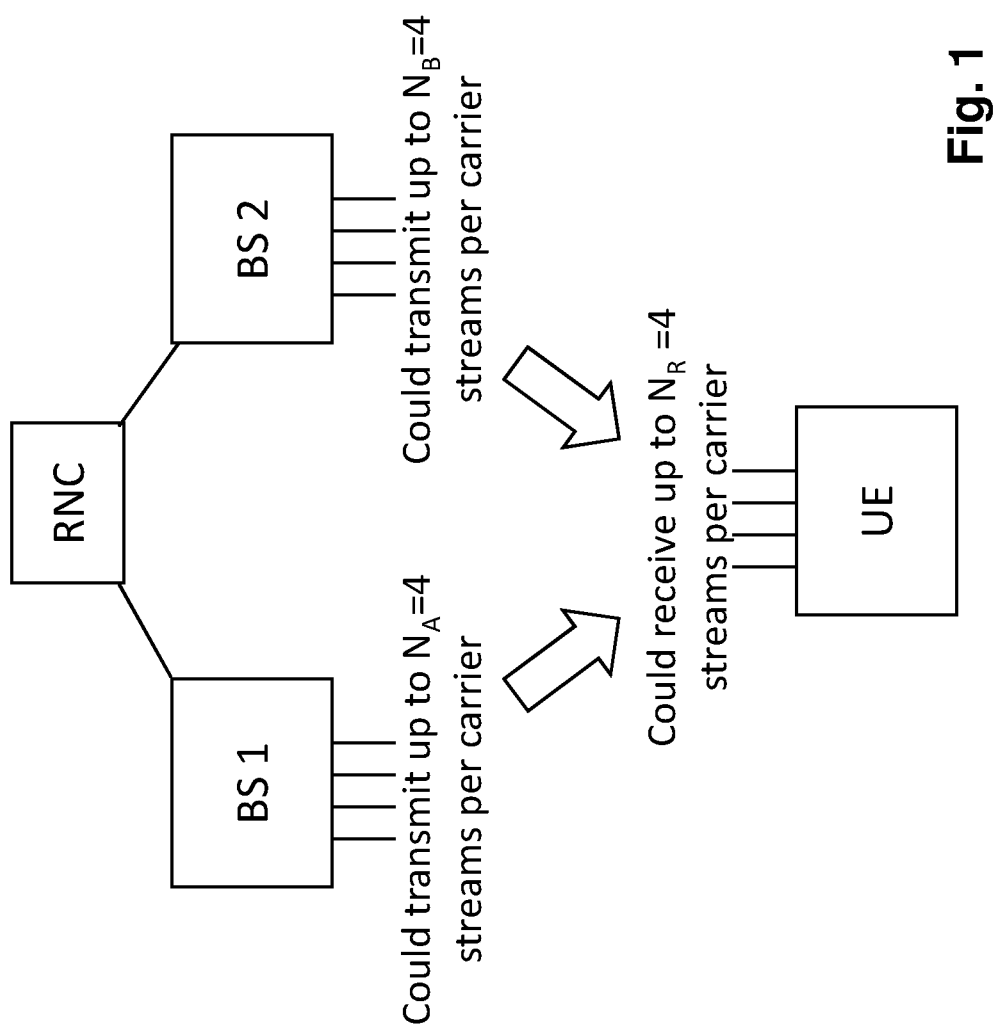
FIG. 1 shows a schematic diagram illustrating a problem in current cellular communication systems, arising if MIMO and MF are enabled.
Figure 2:
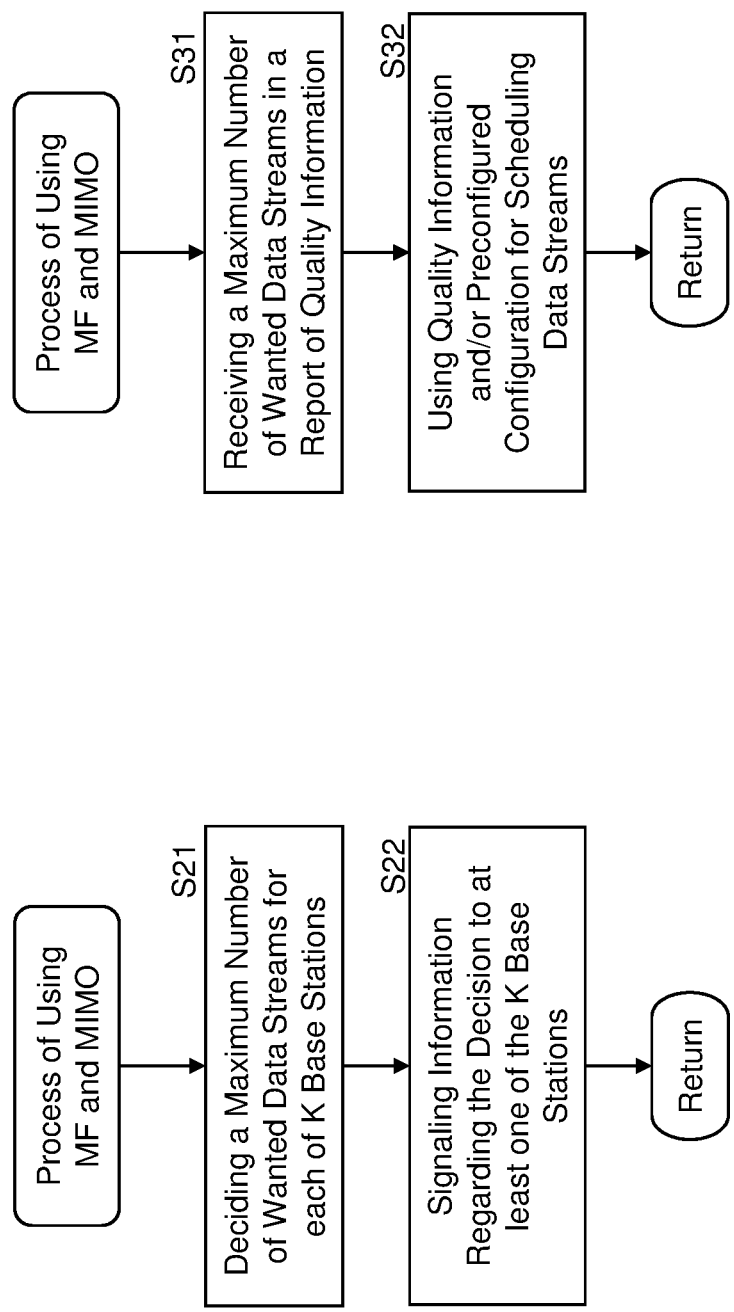
FIG. 2 shows a flowchart illustrating a process of using MIMO and MF according to an embodiment of the invention.

According to an embodiment of the invention illustrated in FIG. 2 which shows a process of jointly using MIMO and MF, for each base station n of K base stations of a cellular communications network a maximum number $M_n$ of wanted data streams per carrier is decided that is to be scheduled to a terminal accessing the cellular communications network, the terminal having $N_R$ receive antennas. K is an integer equal to or greater than two, and n goes from 1 to K (step S21). Information regarding the decision in step S21 is signaled to at least one of the K base stations (S22).

The K base stations may be e.g. base stations involved in a HO. The process shown in FIG. 2 may be performed at the network side and/or at the terminal side. At the network side, the process may be implemented in a control entity such as an RNC and/or in the base stations. The control entity, the base stations and the terminal each comprise processing resources, memory resources and interfaces for performing the process.

Figure 3:
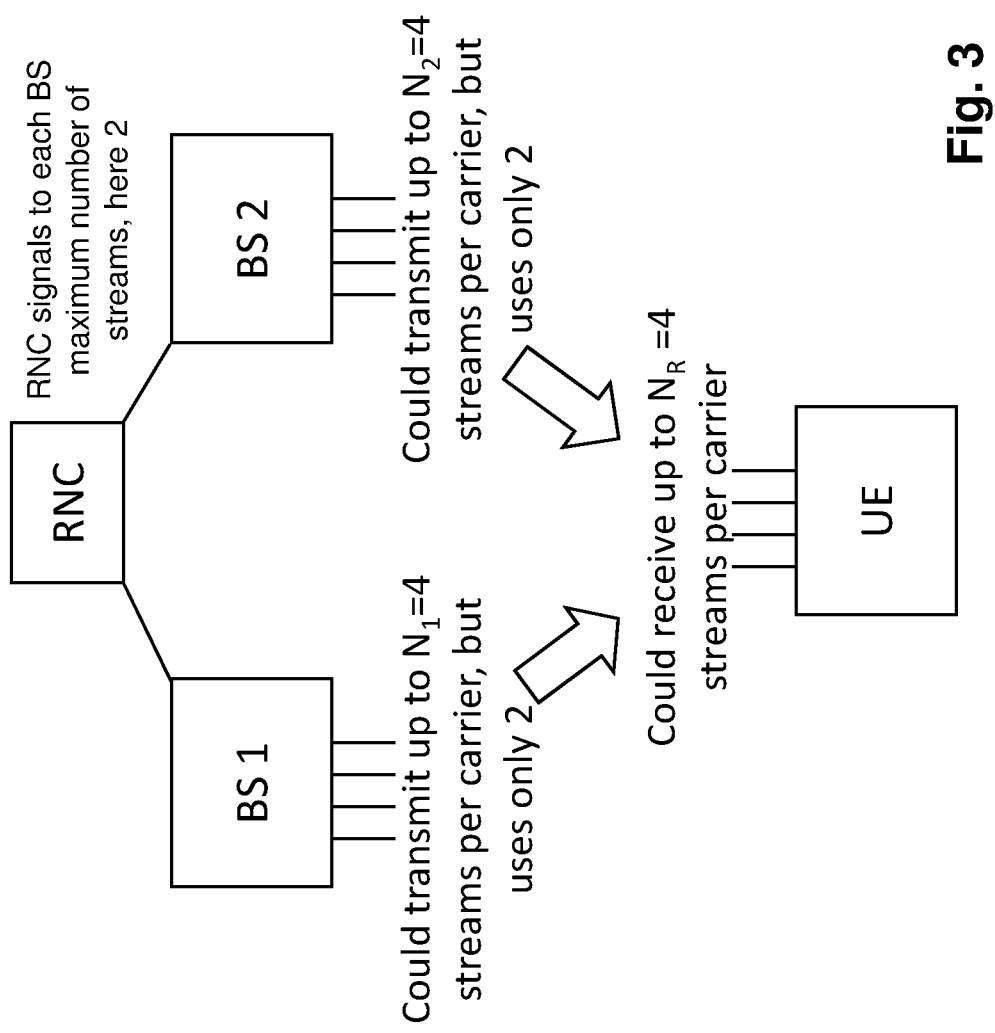
FIG. 3 shows a schematic diagram illustrating a network-sided implementation example of the process of using MIMO and MF.

FIG. 3 shows a schematic diagram illustrating an infrastructure, i.e. network, sided implementation example. In this example, the network side (RNC or BSs) imposes constraints on the number of data streams to be transmitted from each BS to a UE according to the capabilities of the UE.

According to a first network-sided implementation example, the decision on how to constrain the maximum number $M_n$ of data streams per base station n and carrier is performed by the RNC, e.g. based on information about antenna configurations of the involved BSs, capabilities of the UE, receive antennas of the UE, channel information or load information from cells of the BSs, a location of the UE, etc. In this case, the RNC signals to each BS which maximum number of data streams it may schedule to a certain UE. That is, referring to FIG. 2, the information regarding the decision which is signalled in step S22 is a result of the decision.

The BS then ensures that this limitation is always met, even if a PCI/CQI feedback from the terminal side asks for more streams.

Referring to FIG. 3, the RNC signals to each BS (K=2 in this example) the maximum number $M_n$ of data streams it may transmit to the UE. In this example, the maximum number is two for BS1 and BS2, i.e. $M_1=2$ and $M_2=2$. The BS1 could transmit up to $N_1=4$ data streams per carrier, but uses only 2 upon request from the RNC. Similarly, the BS2 could transmit up to $N_2=4$ data streams per carrier, but uses only 2 upon request from the RNC.

Hence, the UE which could receive up to $N_R=4$ data streams per carrier will receive 4 data streams per carrier at maximum.

According to a second network-sided implementation example, the decision is performed by each BS individually. In this case, to the BS information about the antenna configurations of the other BS may be signalled e.g. by the RNC. That is, referring to FIG. 2, the information regarding the decision which is signalled in step S22 is information about other BS(s).

The BSs then act according to the following heuristic rule: If a terminal with $N_R$ receive antennas is located in a HO area, it may only receive at most max $(N_R-N_2, \text{floor}(N_R/2))$ streams from base station and max $(N_R-N_1, \text{floor}(N_R/2))$ streams from base station 2 on the same carrier, where $N_1$ and $N_2$ are the number of transmit antennas at base stations 1 and 2, respectively. The function floor( ) rounds any value down to the nearest integer, and the function max( ) returns the higher of the two parameters inside the parentheses. Some numerical examples (but not all possibilities) are given in table 1 below. The BS ensures that this limitation is always met, even if the PCI/CQI feedback from the terminal side asks for more streams.

TABLE 1

| $N_1$ Number of transmit antennas of base station 1 | $N_2$ Number of transmit antennas of base station 2 | $N_R$ Number of receive antennas of terminal | Max. number $M_1$ of streams base station 1 may transmit to terminal | Max. number $M_2$ of streams base station 2 may transmit to terminal |
|---|---|---|---|---|
| 2 | 2 | 2 | 1 | 1 |
| 2 | 2 | 4 | 2 | 2 |
| 4 | 4 | 2 | 1 | 1 |
| 4 | 4 | 4 | 2 | 2 |
| 4 | 1 | 4 | 3 | 1 |

It is to be noted that the above heuristic rule may be applied also by the RNC in the first network-sided implementation example.

Figure 4:
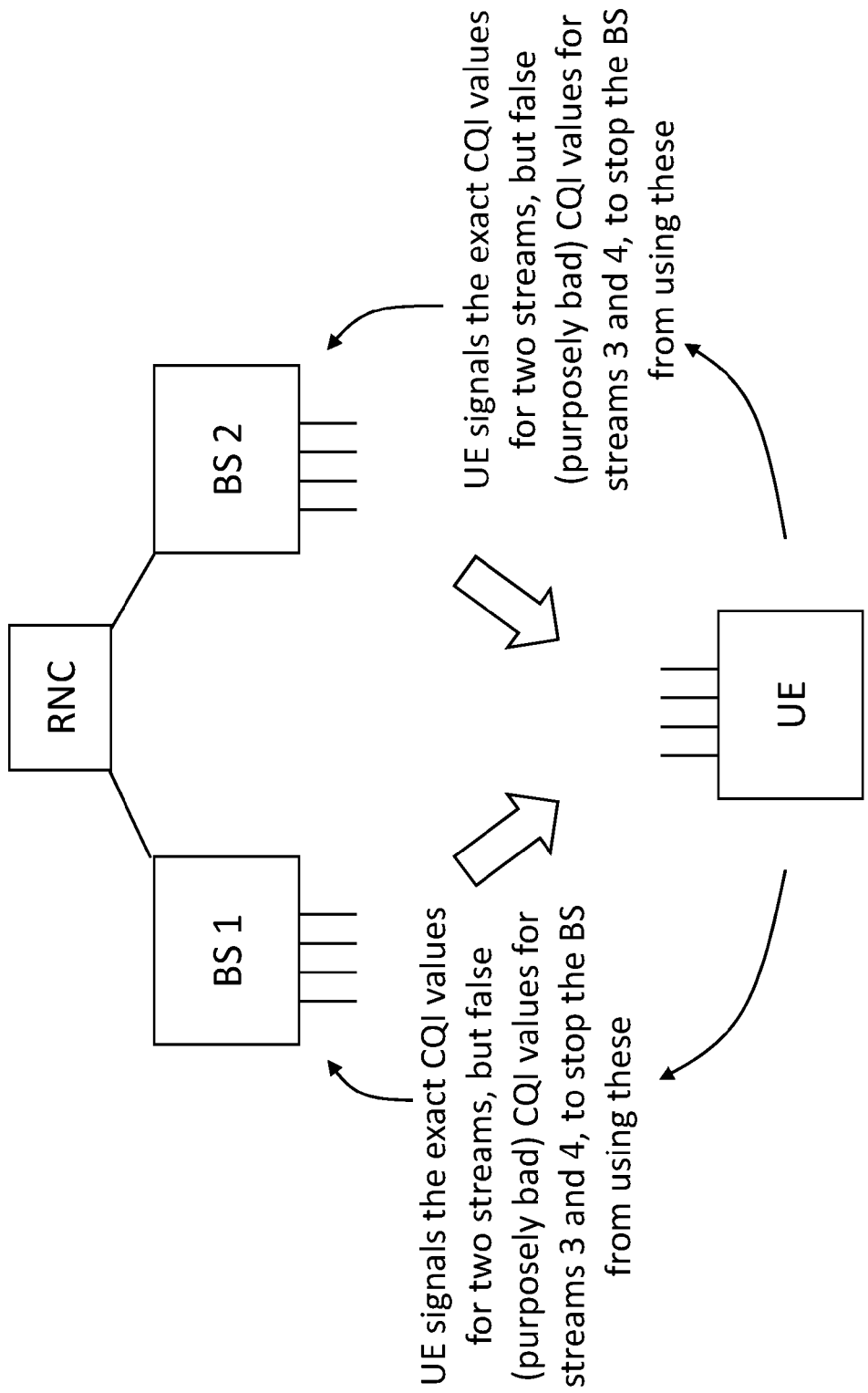
FIG. 4 shows a schematic diagram illustrating a terminal-sided implementation example of the process of using MIMO and MF.

FIG. 4 shows a schematic diagram illustrating a terminal sided implementation example. In this example, the terminal side implicitly imposes constraints on the number of data streams it receives from each BS by modifying PCI/CQI (quality information) feedback it reports to the base stations. That is, referring to FIG. 2, the information regarding the decision which is signalled in step S22 is a result based on the decision.

More precisely, the UE indicates in the PCI/CQI feedback to the BSs that these are recommended not to transmit more than a certain number of streams. This may be done, for example, by purposely forwarding very bad CQI information for those streams that would—if activated—lead to the problem stated above. That is, the UE basically "fakes" the CQI feedback for certain streams by reporting purposely wrong and pessimistic CQI values to prevent the BSs from using a too high number of transmit streams. The UE could also feed back a special PCI/CQI value predefined int the BS and in the UE in order to send a recommendation to the network. The UE can also report NACK values for correctly received packets, so as to suggest to the BS by other means than CQI that channel conditions are not good. It is optional for the network to follow these recommendations but it ensures good quality if the network does so.

Referring to FIG. 4, the number $N_R$ of receive antennas of the UE is four, and the numbers $N_1$ and $N_2$ of transmit antennas of BS1 and BS2 are four. In case the UE decides maximum numbers $M_1$ and $M_2$ of wanted data streams to 2, the UE signals to BS1 and BS2 exact CQI values for two streams, but false (purposely bad) CQI values for any additional streams, e.g. streams 3 and 4 in this example, to stop the BS1 and BS2 from using these streams. The UE may apply the above heuristic rule for the decision.

To ensure that the maximum number of streams is not exceeded, the base stations should refrain from activating streams for which bad or special CQI was received. FIG. 5 shows a flowchart illustrating a process of using MIMO and MF, which considers the network side. The BS1/BS2 receives, in a report of quality information (e.g. CQI feedback), a maximum number of data streams per carrier that should be scheduled to the UE (step S31). Then the BS1/BS2 uses the quality information for scheduling of data streams to the UE (step S32).

In contrast, in the network-sided implementation examples, in step S32 the BS1/BS2 uses a configuration preconfigured by the RNC or BS1/BS2 for scheduling of data streams to the terminal.

According to a further example of the terminal-sided implementation of the process of jointly using MIMO and MF, a CQI (quality information) reporting format is adjusted such that again the total number of streams does not exceed the possible rank and the streams are assigned to the BSs in arbitrary fashion. Such reduced/flexible CQI feedback can be on one hand optimized to report all streams from the BSs and on the other hand significantly reduce the critical resources needed by reporting required PCI/CQI values only.

That is, the amount of streams per BS are adjusted based on feedback by the UE, and the corresponding feedback resources e.g. for PCI and/or CQI are adjusted accordingly. This can be done as long as the total number of streams does not exceed the channel rank, and as long as the UE and the BSs have a common understanding of the quality information reporting format.

According to an example, a UE having 4 receive antennas is assumed which is capable of receiving up to 4 data streams per carrier. The UE is configured in SF-DC MF with BS1 having 4 transmit antennas and BS2 having 4 transmit antennas. Assume also a reporting format where {[TTI 1], [TTI 2]} has {[CQI01 CQI02], [CQI11 CQI12]}, and where CQI0x is assigned to BS1 and CQI1x to BS2. "CQI" may be in fact a ss-CQI or a ds-CQI. The ds-CQI compresses the CQI of the two streams in the same amount of bits as the ss-CQ. That is, in this example of a 4×4 MIMO CQI format, one TTI carries up to 4 streams' CQIs separately. For instance, in case of a 4-stream transmission from one BS1, CQI01 carries streams 1 and 2, and CQI02 streams 3 and 4. In case of a single stream transmission, CQI01 carries stream 1, and CQI02 is a repetition of CQI01.

Assume that the UE determines that large-scale channel conditions are such that it prefers to consistently receive one stream from BS1 and up to three streams from BS2. The UE then reports this to RNC by RRC messaging. It is optional for the network to follow these recommendations but it ensures good quality if the network does so.

The RNC then may configure the BSs and the UE to adopt a new common understanding of the feedback information where more feedback resources are assigned to BS2 and less to BS1. Following the example, the second CQI field that belonged to BS1 now is assigned to BS2. That is, the new format can be defined as {[CQI01' CQI11'], [CQI12' CQI13']} where each of the CQI' may take only the form of carrying the CQI of a single stream.

That is, a format of reporting the quality information from the UE to the BSs is adapted and aligned between the UE and the BSs via signaling which may involve the RNC.

Figure 6:
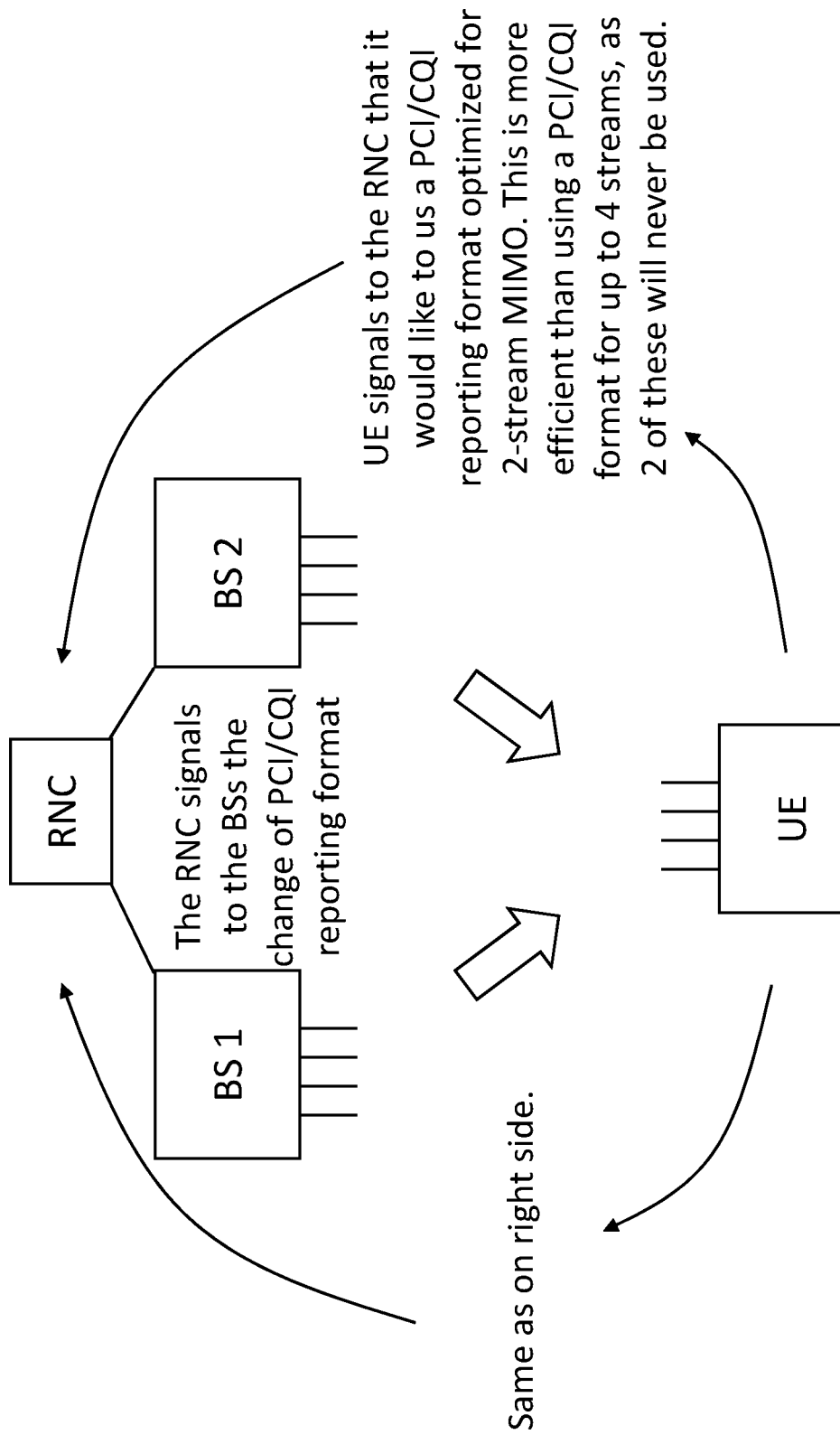
FIG. 6 shows a schematic diagram illustrating a further example of the terminal-sided implementation of the process of using MIMO and MF.

FIG. 6 illustrates a reconfiguration of PCI/CQI reporting formats. The number $N_R$ of receive antennas of the UE is four, and the numbers $N_1$ and $N_2$ of transmit antennas of BS1 and BS2 are four. The UE decides to receive two data streams at maximum from each of the BSs, and signals to the RNC that a PCI/CQI reporting format is to be used which is optimized for 2-stream MIMO. This is more efficient than using a PCI/CQI reporting format for up to 4 streams, as 2 of these will not be used. The RNC signals to the BSs the change of the PCI/CQI reporting format.

Note that the above example performs a distribution of resources across slots and TTIs, that is, across time. As already a reporting period of minimal two TTIs is required, other reporting periods may take into account also additionally the dimension of multiple cells.

As described above, the network-sided mechanisms constrain the number of streams base stations may transmit to a given terminal on one carrier.

The terminal-sided solution illustrated in FIG. 4 influences the base station side via modified PCI/CQI feedback to restrain from using too many transmit streams.

The terminal-sided solution illustrated in FIG. 6 additionally minimizes PCI/CQI feedback.

A better performance may be achieved if the maximum number of transmit streams per base station and carrier is constrained at the terminal side. In terms of PCI/CQI reporting overhead, it is beneficial to use the solution illustrated in FIG. 6, regardless of whether the network-sided or terminal-sided solution is in place.

Note that the above description considers the number of streams a UE may receive on the same carrier. If a UE is served via multiple carriers, the above embodiments and implementation examples apply to the particular MIMO+MF constellation on each carrier. In such a scenario, the solution illustrated in FIG. 6 is beneficial in view of the needed amount of PCI/CQI feedback.

According to an aspect of the invention, an apparatus is provided which comprises means for deciding for each base station n of K base stations of a cellular communications network a maximum number $M_n$ of wanted data streams per carrier that is to be scheduled to a terminal accessing the cellular communications network, the terminal having $N_R$ receive antennas and K being an integer equal to or greater than two, and n going from 1 to K, and means for signaling information regarding the decision to at least one of the K base stations.

The apparatus may be a base station n of the K base stations and the signaling means may signal the number $N_n$ of transmitting antennas of the apparatus to other base stations of the K base stations.

Alternatively or in addition, the apparatus may be a controller controlling the K base stations.

Alternatively or in addition, the apparatus may be the terminal and the signaling means may signal a result based on the decision to at least one of the K base stations by transmitting quality information corresponding to the decision to at least one of the K base stations.

The apparatus may further comprise means for indicating the maximum number $M_n$ of wanted data streams by a number, preconfigured for each of the K base stations, of pieces of quality information, and means for transmitting the pieces of quality information to at least one of the K base stations.

The indicating means may indicate data streams that are not to be transmitted by base station n by a piece of quality information that deviates from the quality information the apparatus has measured.

The signaling means may signal the result to the cellular communications network in a radio resource control message.

The apparatus may further comprise means for adapting a format of reporting the quality information from the apparatus to at least one of the K base stations and means for aligning the format between the apparatus and the base station via signaling.

The apparatus may further comprise means for configuring a number of pieces of quality information in relation to the maximum number $M_n$ of wanted data streams and the transmitting means may transmit the number of pieces of quality information to at least one of the K base stations.

The deciding means, indicating means, adapting means, aligning means, configuring means, signaling means and transmitting means may by implemented by processing resources of each of the terminal, base stations and controller, which may use memory resources and interfaces of each of the terminal, base stations and controller.

According to an aspect of the invention, an apparatus of a cellular communications network is provided which comprises means for receiving, in a report of quality information, a maximum number of data streams per carrier that is to be scheduled to a terminal accessing the cellular communications network, and means for using the quality information and/or a preconfigured configuration stored in the cellular communications network for scheduling of data streams to the terminal.

The receiving means and using means may by implemented by processing resources of the cellular communications network, which may use memory resources and interfaces of the cellular communications network.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
    deciding for each base station n of K base stations of a cellular communications network a maximum number $M_n$ of wanted data streams per carrier that is to be scheduled to a terminal accessing the cellular communications network, the terminal having $N_R$ receive antennas and K being an integer equal to or greater than two, and n going from 1 to K; and
    signaling information regarding the decision to at least one of the K base stations,
wherein, when K is equal to two, the maximum number $M_1$ of data streams per carrier that is to be scheduled by base station 1 is decided as:

$M_1 = \max(N_R-N_2, \text{floor}(N_R/2))$, wherein $N_2$ is the number of transmitting antennas of base station 2, and the maximum number $M_2$ of data streams per carrier that is to be scheduled by base station 2 is decided as:

$M_2 = \max(N_R-N_1, \text{floor}(N_R/2))$, wherein $N_1$ is the number of transmitting antennas of base station 1.

2. The method of claim 1, wherein the decision is based on a number $N_n$ of transmitting antennas of each of the K base stations.

3. The method of claim 1, wherein the decision is based on at least one of the following: capabilities of the terminal, $N_R$ receive antennas of the terminal, channel information, load information from cells of the K base stations and a location of the terminal.

4. The method of claim 1, comprising:
signaling the number $N_n$ of a base station n of the K base stations to a base station of the K base stations other than the base station n.

5. The method of claim 1, wherein the method is performed by at least one network element of the cellular communications network and the signaling is performed in the cellular communications network.

6. The method of claim 1, wherein the information regarding the decision comprises a result based on the decision, the method comprising:
signaling the result to at least one of the K base stations by transmitting quality information corresponding to the decision to at least one of the K base stations.

7. The method of claim 6, comprising:
indicating the maximum number $M_n$ of wanted data streams by a number, preconfigured for each of the K base stations, of pieces of quality information, and transmitting the pieces of quality information to at least one of the K base stations.

8. The method of claim 7, wherein data streams that are not to be transmitted by base station n are indicated by a piece of quality information that deviates from the quality information the terminal has measured.

9. The method of claim 1, comprising:
signaling the information regarding the decision to the cellular communications network in a radio resource control message.

10. The method of claim 9, comprising:
adapting a format of reporting the quality information from the terminal to at least one of the K base stations and aligning the format between the terminal and the base station via signaling.

11. The method of claim 10, wherein the adapting comprises:
configuring a number of pieces of quality information in relation to the maximum number $M_n$, of wanted data streams and transmitting the number of pieces of quality information to at least one of the K base stations.

12. A method comprising:
receiving at each base station n of K base stations of a cellular communications network, in a report of quality information, a maximum number, $M_n$, of data streams per carrier that is to be scheduled to a terminal accessing the cellular communications network, the terminal having $N_R$ receive antennas and K being an integer equal to or greater than two, and n going from 1 to K; and
using the quality information and/or a preconfigured configuration stored in the cellular communications network for scheduling of data streams to the terminal,
wherein, when K is equal to two, the maximum number $M_1$ of data streams per carrier that is to be scheduled by base station 1 is decided as:

$M_1 = \max(N_R-N_2, \text{floor}(N_R/2))$, wherein $N_2$ is the number of transmitting antennas of base station 2, and the maximum number $M_2$ of data streams per carrier that is to be scheduled by base station 2 is decided as:

$M_2 = \max(N_R-N_1, \text{floor}(N_R/2))$, wherein $N_1$ is the number of transmitting antennas of base station 1.

13. A non-transitory computer readable medium storing a program comprising software code portions that, when executed by a processing device, cause an apparatus to perform the steps of claim 1.

14. The non-transitory computer readable medium according to claim 13, wherein the program is directly loadable into an internal memory of the processing device.

15. An apparatus configured to:
decide for each base station n of K base stations of a cellular communications network a maximum number $M_n$ of wanted data streams per carrier that is to be scheduled to a terminal accessing the cellular communications network, the terminal having $N_R$ receive antennas and K being an integer equal to or greater than two, and n going from 1 to K; and
signal information regarding the decision to at least one of the K base stations,
wherein, when K is equal to two, the maximum number $M_1$ of data streams per carrier that is to be scheduled by base station 1 is decided as:

$M_1 = \max(N_R-N_2, \text{floor}(N_R/2))$, wherein $N_2$ is the number of transmitting antennas of base station 2, and the maximum number $M_2$ of data streams per carrier that is to be scheduled by base station 2 is decided as:

$M_2 = \max(N_R-N_1, \text{floor}(N_R/2))$, wherein $N_1$ is the number of transmitting antennas of base station 1.

16. The apparatus of claim 15, wherein the apparatus is a base station n of the K base stations and is configured to signal its number $N_n$ of transmitting antennas to other base stations of the K base stations.

17. The apparatus of claim 15, wherein the apparatus is a controller controlling the K base stations.

18. The apparatus of claim 15, wherein the information regarding the decision is a result based on the decision, and the apparatus is the terminal and is configured to signal the result to at least one of the K base stations by transmitting quality information corresponding to the decision to at least one of the K base stations.

19. The apparatus of claim 18, configured to:
indicate the maximum number $M_n$ of wanted data streams by a number, preconfigured for each of the K base stations, of pieces of quality information, and transmit the pieces of quality information to at least one of the K base stations.

20. The apparatus of claim 19, configured to indicate data streams that are not to be transmitted by base station n by a piece of quality information that deviates from the quality information the apparatus has measured.

21. The apparatus of claim 15, configured to:
signal the information regarding the decision to the cellular communications network in a radio resource control message.

22. The apparatus of claim 18, configured to:
adapt a format of reporting the quality information from the apparatus to at least one of the K base stations and align the format between the apparatus and the base station via signaling.

23. The apparatus of claim 22, configured to:
configure a number of pieces of quality information in relation to the maximum number $M_n$ of wanted data streams and transmit the number of pieces of quality information to at least one of the K base stations.

24. The apparatus of claim 15, configured to:
receive, in a report of quality information, the maximum number of data streams per carrier that is to be scheduled to the terminal accessing the cellular communications network; and
use the quality information and/or a preconfigured configuration stored in the cellular communications network for scheduling of data streams to the terminal.

25. The apparatus of claim 15, wherein the decision is based on at least one of the following: capabilities of the terminal, $N_R$ receive antennas of the terminal, channel information, load information from cells of the K base stations and a location of the terminal.

26. An apparatus, comprising:
processing resources; and
memory resources including computer program code,
the memory resources and the computer program code configured, with the processing resources, to cause the apparatus to perform at least the following:
decide for each base station n of K base stations of a cellular communications network a maximum number $M_n$ of wanted data streams per carrier that is to be scheduled to a terminal accessing the cellular communications network, the terminal having $N_R$ receive antennas and K being an integer equal to or greater than two, and n going from 1 to K; and
signal information regarding the decision to at least one of the K base stations,
wherein, when K is equal to two, the maximum number $M_1$ of data streams per carrier that is to be scheduled by base station 1 is decided as:
$M_1 = \max(N_R - N_2, \text{floor}(N_R/2))$, wherein $N_2$ is the number of transmitting antennas of base station 2, and
the maximum number $M_2$ of data streams per carrier that is to be scheduled by base station 2 is decided as:
$M_2 = \max(N_R - N_1, \text{floor}(N_R/2))$, wherein $N_1$ is the number of transmitting antennas of base station 1.

* * * * *